United States Patent
Miller et al.

(10) Patent No.: US 6,208,392 B1
(45) Date of Patent: *Mar. 27, 2001

(54) METALLIC STANDOFF FOR AN ELECTRO-OPTICAL DEVICE FORMED FROM A FOURTH OR HIGHER METAL INTERCONNECTION LAYER

(75) Inventors: Anthony C. Miller, Gilbert; Kannan Raj, Chandler, both of AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/258,226

(22) Filed: Feb. 26, 1999

(51) Int. Cl.[7] ........................ G02F 1/1333; G02F 1/1339
(52) U.S. Cl. .............................. 349/84; 349/155
(58) Field of Search ..................... 349/191, 155, 349/147, 162, 84, 143, 139, 156

(56) References Cited

U.S. PATENT DOCUMENTS

| | | | |
|---|---|---|---|
| 5,181,132 | * 1/1993 | Shindo et al. | 359/58 |
| 5,461,501 | * 10/1995 | Sato et al. | 349/42 |
| 5,739,890 | * 4/1998 | Uda et al. | 349/162 |
| 5,764,324 | 6/1998 | Lu et al. | 349/113 |
| 5,818,558 | * 10/1998 | Ogishima | 349/162 |
| 5,905,557 | 5/1999 | Yaniv | 349/143 |
| 5,905,558 | 5/1999 | Tokunaga et al. | 349/149 |

* cited by examiner

Primary Examiner—Walter J. Malinowski
(74) Attorney, Agent, or Firm—Trop, Pruner & Hu, P.C

(57) ABSTRACT

An electro-optical device may be defined using metallic standoffs between a top plate and a substrate, such as a silicon substrate in a liquid crystal on silicon (LCOS) technology. In one embodiment, the metallic standoffs may be formed from a metal layer, such as metal four layer, above the metal layer used to form the metal pixel mirrors. In this way, relatively constant and uniform cell thicknesses may be achieved without significantly increasing the processing overhead.

19 Claims, 2 Drawing Sheets

METALLIC STANDOFF FOR AN ELECTRO-OPTICAL DEVICE FORMED FROM A FOURTH OR HIGHER METAL INTERCONNECTION LAYER

BACKGROUND

This invention relates generally to electro-optical devices such as liquid crystal devices.

Liquid crystal displays use a spatial light modulator (SLM) made up of a top plate and a substrate which surround a liquid crystal material. Conventionally, the region for the liquid crystal material is defined by spacer balls which may be distributed over the substrate. In addition, it is To known to fabricate insulating spacers directly on a silicon substrate. The function of the spacers is to maintain the distance between the top plate and the substrate and to define the region for the liquid crystal.

Liquid crystal devices using liquid crystal over a silicon substrate (LCOS) technology may form large screen projection displays or smaller displays (using direct viewing rather then projection technology). Typically, the liquid crystal material is suspended over a thin passivation layer. A glass plate with an indium tin oxide (ITO) layer covers the liquid crystal, creating the liquid crystal unit sometimes called a cell. The glass layer is typically suspended over the liquid crystal by a gasket that surrounds the cell array.

A silicon substrate may define a large number of pixels. Each pixel may include semiconductor transistor circuitry in one embodiment. The pixel may have a top reflective layer. An electrical potential may be applied to an electro-optical material using the reflective layer. A transparent top plate may have an inner transparent conductive layer that acts as an electrode that works with the reflective layer. An electrical field generated at each pixel may alter optical characteristics of an electro-optical material between the silicon substrate and the top plate. For example, the polarization of light passing through the electro-optical material may be altered. As another example, the electro-optical material may change its light transmission characteristics.

In some cases a standoff may be used to support the top plate. However, it is desirable to maintain a constant cell gap, thereby creating a constant liquid crystal thickness over the entire area of a cell array. To varying degrees, the use of discrete spacers is a simple way of providing this spacing, but in many cases they may not provide a sufficiently constant cell thickness.

Another technique uses an oxide spacer which may be formed on top of the pixel mirrors. However, this technique has the disadvantage that it requires extra processing steps.

Thus, there is a continuing need for a way to improve the uniformity of the spacing between the top plate and substrate in electro-optical devices without unduly increasing processing overhead.

SUMMARY

In one embodiment of the present invention, an electro-optical device includes a top plate and a silicon substrate. A metallic standoff is situated between the substrate and the top plate.

DETAILED DESCRIPTION

Figure 1:
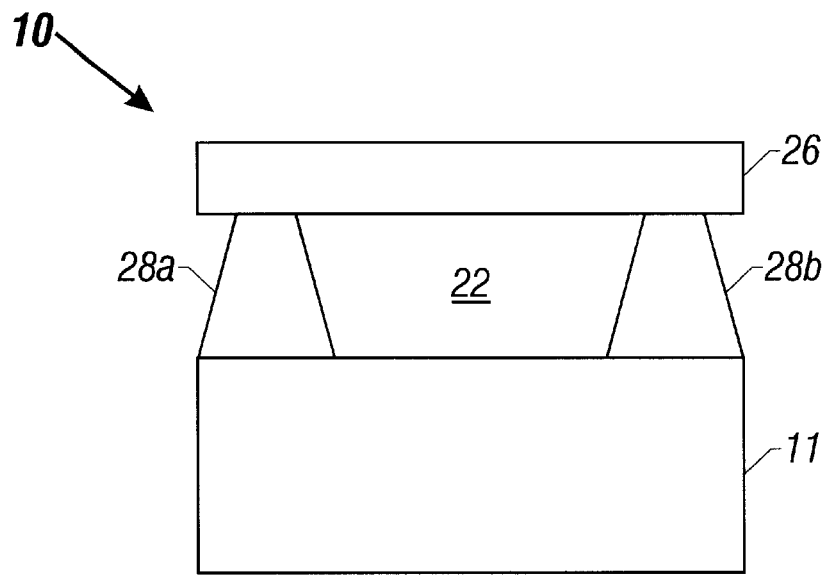
FIG. 1 is a side elevational view of one embodiment of the present invention.

Referring to FIG. 1, an electro-optical device 10, such as a spatial light modulator (SLM), includes a substantially light transmissive top plate 26 and a substrate 11. A plurality of metallic standoffs 28, including the standoffs 28a and 28b, provide spacing between the substrate 11 and the top plate 26. The metallic standoffs 28 may be formed using conventional semiconductor manufacturing processing. For example, in one embodiment of the invention, they may be formed (by etching, for example) from the metal four (or higher) metal layer used in conventional semiconductor processing. Thus, little or no additional processing overhead may result from forming spacers in this way. In addition, the spacers provide a very well defined cell thickness across even large arrays of cells.

The metallic standoffs 28 may be formed entirely or partially of a metallic material. Suitable metallic materials include metals, such as aluminum, copper, and tungsten metal alloys, and polysilicon including metal silicides. In some embodiments the standoffs 28 may be formed of an electrically conductive material such as metal or doped polysilicon.

Figure 2:
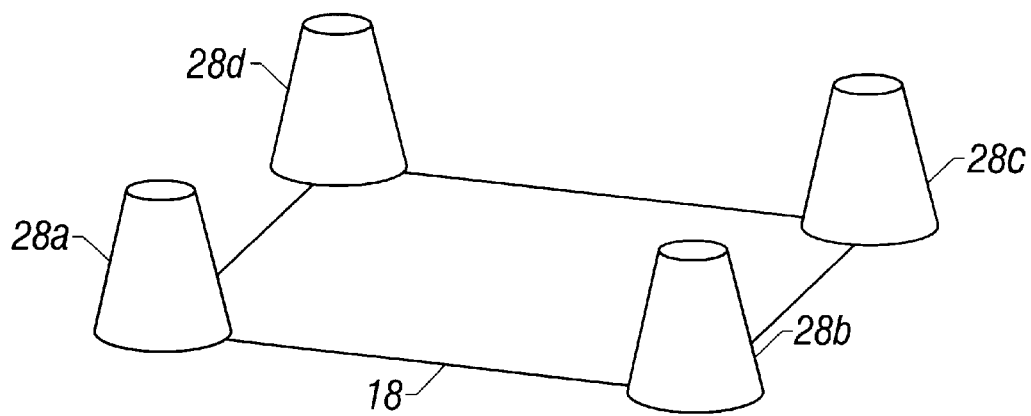
FIG. 2 is a cross-sectional view taken generally along the line, 2—2 in FIG. 1.

Referring to FIG. 2, each cell may include a reflective mirror 18. In the illustrated embodiment, the cell 18 is rectangular or square and a standoff 28a–d is formed at each of the cell's corners. In one embodiment, each of the standoffs partly overlaps each cell to assist in spacing a total of four adjacent cells. Of course, in other embodiments a higher or lower number of standoffs may be used. In addition, while the standoffs 28 are illustrated as having a truncated frustoconical shape, other standoff shapes may be used as well, including cylindrical, pyramidal, and rectangular solid shapes.

Figure 3:
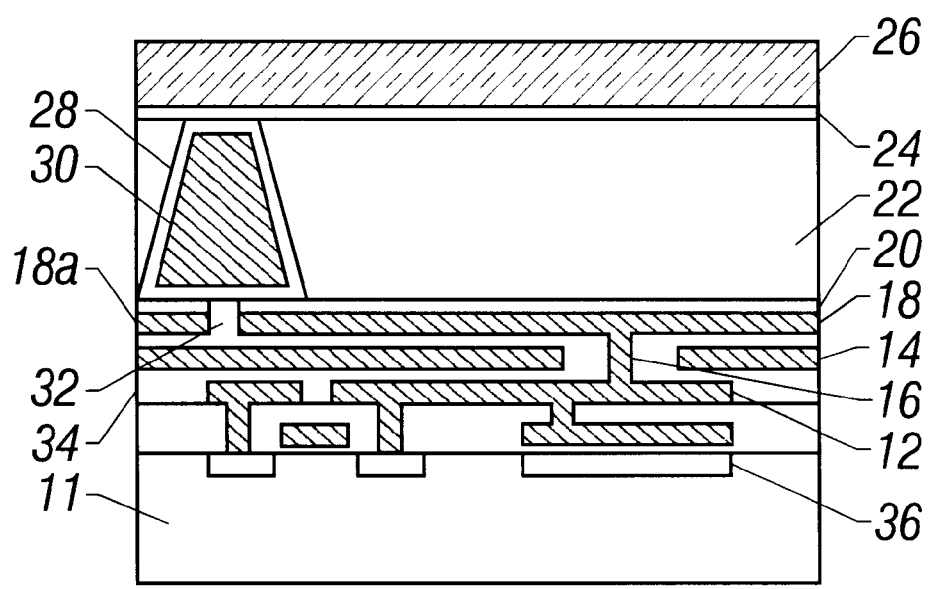
FIG. 3 is an enlarged cross-sectional view taken vertically through one of the standoffs shown in FIG. 1.

Referring now to FIG. 3, the detailed configuration of one embodiment of the present invention is illustrated. In this embodiment, an LCOS structure is defined using the silicon substrate 11 having doped regions 36 formed therein. In one illustrated embodiment, four or more metal layers are provided including a metal one layer 12 which is spaced by an interlayer dielectric (ILD) 34 from a metal two layer 14 and a metal three layer 18, which may form a pixel mirror. In one embodiment the metal two layer may provide light blocking and the metal one layer may provide the necessary interconnections for the semiconductor devices. This leaves the metal four (or higher) layer to form the standoffs 28. The pixel mirror 18 may electrically connect to the metal one layer 12 using a via 16, which in one embodiment of the invention may be formed of tungsten.

A gap 32 may exist between adjacent cells as illustrated in FIG. 2. Thus, the layer 18 may be part of one cell while the layer 18a is the beginning of an adjacent cell. A standoff 28 may straddle at least two adjacent cells, and in some cases, such as the one illustrated in FIG. 2, each standoff 28 may straddle four adjacent cells.

In one embodiment of the invention, the standoffs 28 may be covered by a dielectric material 30 formed during passivation. Typically, the material 30 is deposited using conventional techniques. Suitable materials for the layer 30 include oxides and nitrides.

The metallic standoffs 28 may be effectively free floating or they may be coupled to a biasing potential. While the illustrated standoff is conical, other shapes including those having more vertical sides (using less isotropic etches for example) may be defined as well.

In this way, existing four (or more) layer metal semiconductor fabrication processes may be used to form spacers in the form of metallic standoffs without adding significant processing overhead. One masking step may define the standoffs, which may be etched in the conventional fashion to form the standoffs. The metallic layer that forms the standoffs for the electro-optical device, may be used for conventional connections in other areas of the die.

The top plate 26 may be coated with an indium tin oxide (ITO) layer 24. In embodiments where the insulating layer 30 is omitted, a polyimide layer may be used between the indium tin oxide layer 24 and the upper end of the metallic standoff 28. The polyimide layer may provide electrical isolation. Other insulating materials may be coated on the ITO layer 24 in place of or in addition to the polyimide layer.

After fabrication, in one embodiment, a liquid crystal material is added to the region 22 using conventional techniques. For example, a gasket material (not shown) may encircle the cell array between the top plate 26 and the substrate 11. A notch (not shown) formed in the gasket allows liquid crystal material to be wicked through the notch into the region 22. The notch may thereafter be sealed using conventional techniques to retain the liquid crystal material in the region 22.

Suitable electro-optical material may include liquid crystals, such as a ferroelectric liquid crystal, a polymer dispersed liquid crystal, a twisted nematic liquid crystal, and a polymer stabilized cholesteric texture liquid crystal.

While the present invention has been described with respect to limited member of embodiments, those skilled in the art will appreciate numerous modifications and variations therefrom. It is intended that the appended claims cover all such modifications and variations as fall within the true spirit and scope of the present invention.

What is claimed is:

1. A electro-optical device comprising:
   a top plate;
   a silicon substrate including at least three metallic interconnection layers, insulating layers and electrical devices; and
   a metallic standoff between said substrate and said top plate, said metallic standoff being formed from a fourth or higher metallic interconnection layer, said metallic interconnection layers providing patterned metallic interconnections between said devices, said layers being separated by said insulating layers.

2. The electro-optical device of claim 1 wherein said silicon substrate includes at least four metal layers.

3. The electro-optical device of claim 2 wherein one of said metal layers provides interconnections for said silicon substrate, another of said metal layers provides for light blocking and still another of said metal layers provides for pixel reflection.

4. The electro-optical device of claim 1 wherein said metallic standoff is covered by an insulator.

5. The electro-optical device of claim 4 including a pixel mirror positioned under said metallic standoff.

6. The electro-optical device of claim 5 wherein said pixel mirror is formed from a metal layer beneath the metal layer used to form said metallic standoff.

7. The electro-optical device of claim 5 including an insulator between said metallic standoff and said pixel mirror.

8. The electro-optical device of claim 7 including at least two pixel mirrors for different cells of said electro-optical device straddled by said metallic standoff.

9. The electro-optical device of claim 8 wherein said pixel mirrors are generally rectangular with a metallic standoff overlapping each of the four corners of said rectangular pixel mirror.

10. A method of forming an electro-optical device comprising:
    forming a silicon substrate having at least four metallic interconnection layers;
    patterning said metallic interconnection layers to form electrical connections;
    forming a metallic standoff from said fourth metallic interconnection layer insulated from said at least three metallic interconnection layers; and
    forming a top plate over said metallic standoff.

11. The method of claim 10 including forming a plurality of cells each including a pixel reflector, and positioning said metallic standoff so as to span more than one cell.

12. The method of claim 11 including forming an insulating layer over said metallic standoff.

13. The method of claim 12 including forming a generally rectangular pixel mirror and positioning a metallic standoff at each of the corners of said pixel mirror.

14. The method of claim 13 including positioning each metallic standoff to overlap four adjacent pixel mirrors.

15. A liquid crystal display device comprising:
    a top plate;
    a silicon substrate having electrical devices and at least four metallic interconnection layers formed in said substrate, said metallic interconnection layers providing patterned metallic interconnections between said devices; and
    a plurality of metallic standoffs defined in at least one of said metal interconnection layers between said substrate and said top plate.

16. The electro-optical device of claim 15 wherein said standoff is formed from a metal layer positioned above three underlying metal layers.

17. The electro-optical device of claim 15 wherein said metallic standoff is covered by an insulator.

18. The electro-optical device of claim 15 including a pixel mirror positioned under said metallic standoff.

19. The electro-optical device of claim 18 wherein said pixel mirror is formed from a metal layer beneath the metal layer used to form said metallic standoff.

* * * * *